United States Patent
Niemiec

(10) Patent No.: US 6,726,957 B2
(45) Date of Patent: Apr. 27, 2004

(54) THERMAL INSULATING AND ACOUSTIC ABSORPTION COATING

(75) Inventor: Matthew Niemiec, Terre Haute, IN (US)

(73) Assignee: Van Etten Holdings, Inc., Terre Haute, IN (US)

( * ) Notice: Subject to any disclaimer, the term of this patent is extended or adjusted under 35 U.S.C. 154(b) by 0 days.

(21) Appl. No.: 10/217,399

(22) Filed: Aug. 13, 2002

(65) Prior Publication Data

US 2004/0033313 A1 Feb. 19, 2004

(51) Int. Cl.$^7$ .............................. B05D 3/02; B05D 3/10; B05D 3/12; C08L 63/00; C08L 83/04
(52) U.S. Cl. ................. 427/327; 427/421; 427/386; 427/387; 525/476; 525/477; 428/418; 428/447; 428/450
(58) Field of Search ................................. 428/413, 414, 428/416, 418, 446, 447, 448, 450; 427/299, 386, 387, 421, 327; 106/14.05, 287.16, 287.22, 400; 523/400; 524/858, 859, 860; 525/476, 477

(56) References Cited

U.S. PATENT DOCUMENTS

| | | |
|---|---|---|
| 3,678,003 A | 7/1972 | Wolfgang et al. |
| 3,714,109 A | 1/1973 | Matherly et al. |
| 3,770,560 A | 11/1973 | Edler et al. |
| 3,833,404 A | 9/1974 | Sperling et al. |
| 3,888,815 A | 6/1975 | Bessmer et al. |
| 3,931,448 A | 1/1976 | Parkinson |
| 4,265,953 A | 5/1981 | Close |
| 4,311,751 A | 1/1982 | Brueggemann et al. |
| 4,341,842 A | 7/1982 | Lampe |
| 4,346,782 A | 8/1982 | Böhm |
| 4,524,107 A | 6/1985 | Marchetti et al. |
| 4,599,261 A | 7/1986 | Hart et al. |
| 4,720,515 A * | 1/1988 | Iji et al. ................ 523/435 |
| 4,746,568 A | 5/1988 | Matsumoto et al. |
| 4,942,080 A | 7/1990 | Heuel et al. |
| 5,530,213 A | 6/1996 | Hartsock et al. |
| 5,566,721 A | 10/1996 | Breese |
| 5,851,327 A | 12/1998 | Landin |

\* cited by examiner

*Primary Examiner*—Philip Tucker
*Assistant Examiner*—Michael J Feely
(74) *Attorney, Agent, or Firm*—Jay G. Taylor; Michael A. Swift; Ice Miller

(57) ABSTRACT

A multifunctional thermochemically cured coating which provides noise reduction and weight reduction in combination with thermal insulating and corrosion resistant properties. The composition comprises an epoxy resin with a weight per epoxide of 175 to 950, a mixed methyl-phenyl hydroxyl functional silicone polymer, a catalyst, a silane, an anti-corrosive pigment, an inert film reinforcing pigment, calcium silicate fibers, a mixture of ground synthetic silicone rubber, silica, and fillers, and an organic solvent.

49 Claims, 2 Drawing Sheets

THERMAL INSULATING AND ACOUSTIC ABSORPTION COATING

BACKGROUND OF THE INVENTION

The present Invention relates to a flexible sound dampening and heat and corrosion resistant polymer coating composition.

Many transportation vehicles, electronic device apparatuses, and machines are subjected to noise and vibration due to the environments within which they operate. Such noise and vibration can present problems in the use or function of the particular device or apparatus and in turn, become annoying or harmful to the users of such devices or apparatuses. In many applications, noise and vibration are reduced by the placing of extensional dampers on the devices or apparatuses being used. Extensional dampers are composite pads comprised of a viscoelastic polymer or resin, filler and additive composition layer having on one side of such layer a pressure sensitive or hot melt adhesive. However, such pads are difficult to affix to or shape around odd shaped parts, i.e. automotive parts.

In the transportation industry, automobiles have been required to become more and more energy efficient because of more stringent governmental energy restrictions. To accomplish this purpose, automobiles have been made smaller and of lighter weight. In particular, automobile parts have been fabricated with lighter gauge metal in an effort to reduce the total weight of the automobile. Accordingly, it has become necessary to find a means to protect the automobile from corrosion for as long a period of time as prior heavier metal parts accomplished and too find further ways to increase the energy efficiency of automobiles by reducing the overall weight of the automobile.

An avenue pursued to increase energy efficiency in automobiles has been to improve automobile mufflers by reducing weight while improving performance. As shown in FIG. 1, prior art mufflers are constructed with standard inside muffler components 5, two separate steel wraps, an inside wrap 10 and an outside wrap 20 with an air space 30 in between. Both steel wraps are necessary to attain the requisite sound dampening and life requirements for the muffler system. The problem with prior art mufflers is that they cannot be reduced in size or weight because a muffler needs the double wrap construction to adequately dampen the sound of the engine. Thus, a coating of some sort would be ideal to place on mufflers to eliminate the need for the inside wall of the muffler and thereby reduce the weight of the muffler and increase the overall efficiency of an automobile. The coating would have to be able to reduce noise and provide thermal insulation of the muffler. Unfortunately, present technology in high temperature coatings does not include products that have insulating and acoustic properties sufficient to allow elimination of the inside steel wall.

Various types of coatings have been placed in or sprayed on parts of the underside exterior surfaces of automobiles. Such coatings are usually used for corrosion protection by providing abrasion or stone-impact resistance for the painted surfaces. Typically such coatings are tough, elastic polyvinyl chloride based and do not provide significant noise and vibration reduction. In some embodiments, epoxy or modified epoxy resin formulations are used as electro-deposition coatings for corrosion protection. Unfortunately, the epoxy or modified epoxy resin formulations usually form brittle or highly cross-linked networks, at thicknesses, which have limited effect with respect to reducing weight, reducing noise and providing thermal insulation.

Another prior art coating is a silicone heat-resisting paint consisting principally of silicone resin or modified silicone resin, metallic zinc and inorganic pigment. However, the paint coating provides little if any effect with respect to reducing noise. This coating cannot be used to eliminate the need for a double wrap muffler construction because it does not have any acoustic properties. Thus, it cannot further reduce the weight of the muffler system by eliminating one of the steel wall of the prior art muffler. In the prior art, no high temperature coatings exist that possess both insulating and acoustic properties sufficient enough to eliminate the inside steel wall of a vehicle muffler.

Further, the need for a coating with acoustic, thermal insulating, and corrosion resistant properties is not limited to the automotive industry. One skilled in the art understands that such a coating could have many applications and solve many different problems in a wide array of technologies. Thus, what is needed is a multifunctional coating which provides noise and weight reduction in combination with thermal insulating and corrosion resistant properties. What is further needed is such a coating which is sprayable and can easily be placed or coated on odd shape parts and which eliminates the need for the dual wall construction of mufflers.

BRIEF SUMMARY OF THE INVENTION

A multifunctional coating which provides noise reduction and weight reduction in combination with thermal insulating and corrosion resistant properties. The composition comprises an epoxy resin with a weight per epoxide of 175 to 950, a mixed methyl-phenyl hydroxyl functional silicone polymer, a catalyst, a silane, an anti-corrosive pigment, an inert film reinforcing pigment, calcium silicate fibers, a mixture of ground synthetic silicone rubber, silica, and fillers, and an organic solvent.

DETAILED DESCRIPTION OF THE INVENTION

Figure 1:
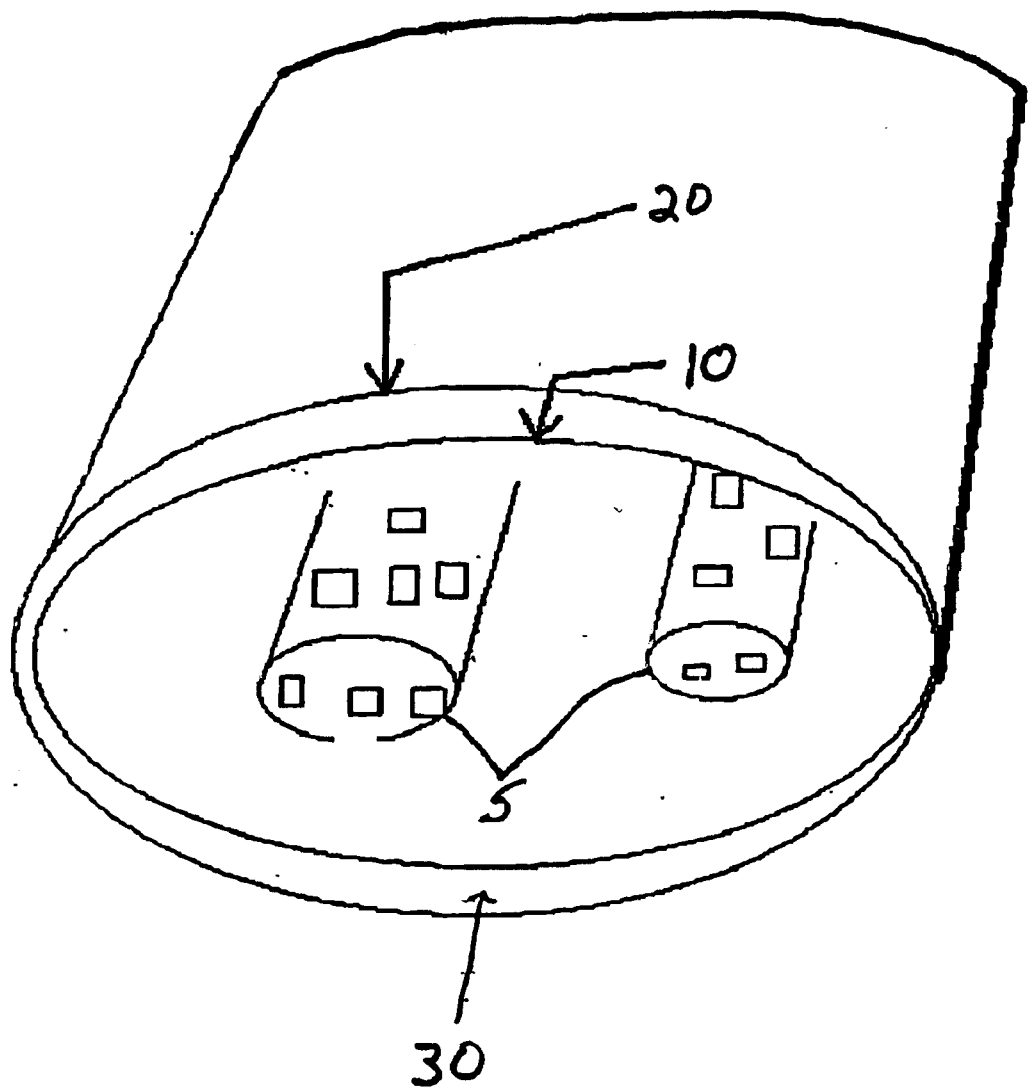
FIG. 1 is a cross-section view showing the double wrap construction of the prior art muffler.

The Invention is a coating composition that will, when properly applied to a substrate, withstand high temperatures while providing sound dampening, thermal insulating and corrosion resistant properties. This high temperature coating not only provides sound dampening but also reduces weight and lowers operating temperatures of a substrate because the substrate will not have to be as robust (thick) due to the coating advantages. For example, the invention may be applied to an external combustion engine exhaust systems thereby allowing the system to be made of a lighter gage metal. The coating is based on silicon/epoxy chemistry combined with ground silicone rubber and catalyzed with organometallic compounds. This polymer combination is mixed with various pigments to give color, hiding, corrosion resistance, and sound dampening properties. Although the initial application of the Invention involves automobile exhaust systems and more particularly mufflers, one of skill in the art understands that the Invention coating is applicable to any substrate where acoustic, thermal insulation, corrosion resistance and potential weight reduction or any combination thereof are desirable.

The composition comprises an epoxy resin with a weight per epoxide of 175 to 950, a mixed methyl-phenyl hydroxyl functional silicone polymer, a catalyst, a silane, an anti-corrosive pigment, an inert film reinforcing pigment, calcium silicate fibers, a mixture of ground synthetic silicone rubber, silica, and fillers, and an organic solvent. Regarding the epoxy resin, at least one epoxy resin with weight per epoxide of 175–950 is preferred. Several manufacturers make suitable epoxy resin including but not limited to EPON, Dow Chemical, Ciba Geigy, and Reichhold Chemical. Examples of EPON manufactured resins, which illustrate rather than limit the Invention, are provided in Table 1.

TABLE 1

EPON Resins

EPON ® Resin 8021
EPON Resin 8081
EPON Resin 8091
EPON Resin 8101
EPON Resin 8111
EPON Resin 8112
EPON Resin 8121
EPON Resin 813
EPON Resin 8131
EPON Resin 8132
EPON Resin 815C
EPON Resin 8161
EPON Resin 8201
EPON Resin 824
EPON Resin 825
EPON Resin 826
EPON Resin 828
EPON Resin 8280
EPON Resin 8281
EPON Resin 829
EPON Resin 829H
EPON Resin 829P
EPON Resin 830
EPON Resin 832
EPON Resin 1001
EPON Resin 1007

Again any other manufacturer's epoxy resin meeting the specified epoxide equivalent weight range is acceptable, for example Dow Chemical products DER 331 and DER 661 are illustrative of epoxy resins used to produce the Invention. The epoxy resin with weight per epoxide of 185–950 is preferable and the weight per epoxide of 185–192 is most preferred. EPON Resin 828 and Dow Chemical's DER 331 epoxy resin are examples of the most preferred epoxy resins.

The mixed methyl-phenyl functional silicone polymer may include both dimethyl and diphenyl function groups in combination with the methyl-phenyl groups. For example, dimethyl-diphenyl or dimethyl-phenyl or methyl-diphenyl or methyl-phenyl and combinations thereof are acceptable. Additionally, hydroxyl groups may be added to the functional silicone polymer in combination with the methyl-phenyl and/or dimethyl-diphenyl and combinations thereof. Dow Chemical, General Electric and other manufacturers produce suitable silicon polymers. Table 2 lists examples of suitable Dow Chemical and General Electric silicon polymers. The most preferable mixed methyl-phenyl hydroxyl functional silicone polymers include Dow Chemical products Z-6018 and DC 6-2230 and G.E. products S.R 355 and S.R. 350.

TABLE 2

Dow Chemical/G.E. Products 804 (Dow Chemical)
805 (Dow Chemical)

TABLE 2-continued

Dow Chemical/G.E. Products 806A (Dow Chemical)
808 (Dow Chemical)
840 (Dow Chemical)
DC6-2230 (Dow Chemical)
Q1-2529 (Dow Chemical)
Q1-2530 (Dow Chemical)
Z-6018 (Dow Chemical)
3037 (Dow Chemical)
X1-3074 (Dow Chemical)
SR141 (G.E.)
SR112 (G.E.)
SR125 (G.E.)
SR165 (G.E.)
SR350 (G.E.)
SR355 (G.E.)

Again, Table 2 is illustrative, not limiting. Any equivalent mixed methyl-phenyl hydroxyl functional silicone polymer is acceptable.

The present Invention can be thermochemically cured at a temperature of at least 400 degrees Fahrenheit or it can be cured at room temperature. When the Invention is thermochemically cured, it is preferred that the catalyst of the present Invention be an organometallic catalyst or a mixture of organometallic catalysts. Suitable organometallic catalysts include but are not limited to organometallic cobalt, tin, lead, zirronium, iron, vanadium, aluminum, calcium, manganese and lanthanum. However, it is preferred that organometallic iron carboxylate in combination with organometallic zinc of 2-ethylhexanoate be used as the catalyst to form the composition.

When the Invention is cured at room temperature, a catalyst that will react with an epoxide group is suitable for use in the present Invention. However, it is preferred that the catalyst of the Invention be either a polyamine catalyst, a Lewis acid catalyst, or an isocyanate catalyst. The polyamine catalyst may be a silane diamine catalyst. Suitable silane diamine catalysts include but are not limited to Witco Chemical A1120, Dow Corning DC21, Dynasylan Damo-T and Addid 900.

Further, the Invention comprises at least one epoxy or methoxy silane. Suitable silane compounds include but are not limited to aminopropyltriethoxysilane, N-(B-aminoethyl)-y-aminopropyltrimethoxysilane, 3-methacryloxypropyltriethoxysilane, vinylbenzyl-amine-methoxy, 3-glycidoxypropyl-trimethoxysilane, methyltrimethoxysilane, phenyltrimethoxysilane, and vinyltrimethoxysilane. Dow Corning produces several products which serve as acceptable silanes, including Z-6011, Z-6020, Z-6030, Z-6032, Z-6040, Z-6070, Z-6124, Z-6137, and 9-6300. While any of these products will work, Z 6040, and Dynasylan Glymo are examples of the most preferable silanes. Even though products are cited from specific manufacturers, one of ordinary skill understands that equivalent silanes produced by other manufacturers are acceptable.

The coating also comprises an anti-corrosive pigment and an inert reinforcing pigment. Many anti-corrosive pigments exist that are suitable for use with the coating. Modified zinc phosphates, such as SNCZ Corporation's TP-5, and zinc chromates, such as Halox SZP391 or Heubach's orthophosphates ZPO, ZCPP and ZCP are preferable. Other anti-corrosive pigments may be used including zinc metaborates and lead chromates. Again one of ordinary skill understands there are many equivalent anti-corrosive pigments that are suitable for use in the present Invention. Any of these can be used alone or in combination in the present Invention, but it is most preferable that SNCZ Corporation TP-5be used as the anti-corrosive pigment.

Many film reinforcing pigments are suitable for use in the present Invention. Suitable reinforcing pigments include but are not limited to aluminum silicate mica, titanium dioxide, lithopone, zinc oxide, calcium carbonate, barium sulfate, magnesium silicate, fumed silica, calcium clay, aluminum oxide, carbon/graphite, mica, and aluminum silicate. One of ordinary skill in the art understands that equivalent reinforcing pigments are suitable for use in the coating composition. However, the most preferable reinforcing pigment is potassium aluminum silicate mica.

Further, the coating incorporates calcium silicate fibers and a ground silicone rubber mixture. Calcium silicate fibers in the form of tricalcium silicate, dicalcium silicate, calcium metasilicate, and combinations thereof are all suitable examples of calcium silicate fibers to be used in the present Invention. While these are suitable examples of calcium silicate fibers, one skilled in the art understands there are many equivalents of calcium silicate fibers that can be used in the present Invention. For example, graphite carbon fibers may be used alternatively in the present Invention.

Most importantly, the composition includes a ground silicone rubber mixture. A suitable rubber mixture is in the form of a linear polysiloxane polymer comprising a mixture of methyl, phenyl and vinyl monomer modifications.

To be adequate for the Invention, the linear polysiloxane polymer needs to be heat cured in the presence of an organic peroxide. Suitable organic peroxides include but are not limited to bis(2,4-Dichlorobenzoyl) peroxide, Di-Benzoyl peroxide, Di-cumyl peroxide, 2,5 Dimethyl-2,5 bis(t-butylperoxy)hexane, and Di-tertiarybutyl peroxide. While these are suitable examples of organic peroxides, one skilled in the art understands these are many equivalents of organic peroxides that can be used in the present Invention. Additionally, before vulcanization, carbon black, calcium carbonates clays, silicas or silicates, talcs, barium sulfates, wollastonites or magnesium carbonates may be added to this mixture. Even though a suitable formula for a ground silicone mixture is provided, one skilled in the art recognizes that many equivalents of this linear polysiloxane polymer can be used in the present Invention.

Prototype coatings utilized a ground silicone rubber mixture produced by Rouse Rubber Industries, Inc. A sieve analysis was used to determine the ground rubber particle size. Table 3 shows the results of the sieve analysis.

TABLE 3

| SCREEN (Micros) | % RETAINED |
|---|---|
| 100 | 0 |
| 120 | 0 |
| 140 | 2 |
| 170 | 15 |
| 200 | 20 |
| Pan | 63 |

A TGA analysis was also performed on the Rouse Rubber product. The TGA analysis showed that the ground rubber mixture comprised acetone extract in the amount of 2.45 percent of the total weight of the mixture, ash in the amount of 41.52 percent of the total weight of the mixture, carbon black in the amount of 27.72 percent of the total weight of the mixture, and RHC in the amount of 28.31 percent of the total weight of the mixture. Even though a suitable ground silicone rubber from Rouse Rubber Industries is discussed herein and was used in the prototype coating, one skilled in the art realizes that many sources for a suitable ground silicone rubber exist.

Organic solvents in the form of aromatic hydrocarbons, alcohols, ketones, esters, or glycol ethers and combinations thereof may be used to produce the coating composition. Suitable aromatic hydrocarbons include but are not limited to zylene, nylene, toluene, AFN 100, and HFN 150. Further, many suitable equivalents to these examples of aromatic hydrocarbons exist and may be used in the present Invention. Suitable alcohols include but are not limited to normal butanol, isomers of butanol, ethanol, isomers of ethanol and equivalents thereof. Further, suitable ketones include but are not limited to methyl ketones, ethyl ketones, MIBK, MIAK, acetone and equivalents thereof. Suitable esters include but are not limited to butyl acetate, butyl acetate isomers, DB Acetate, EB Acetate, and equivalents thereof. Finally, suitable glycol ethers preferably are either ethylene based or propylene based. While any of these solvents will work, it is preferred that zylene, propylene glycol ether, acetate or butanol be used as the organic solvent to produce the coating composition.

Optionally, a pigment, a thickening agent, an anti-settling agent, a wetting agent, or combinations thereof may be added to form the coating composition. The pigment's function is to change the color of the coating composition, to enhance performance and to reduce the cost of producing the composition. Suitable pigments include but are not limited to manganese ferrite, copper chromite spinet type pigment, mixed iron oxides, carbon black pigment and lamp black pigment. One skilled in the art realizes that many equivalent types of pigments exist and may be used in the present Invention. The most preferred pigments are manganese ferrite and the copper chromite spinel type pigments.

Further, a thickening agent, an anti-settling agent and wetting agent can be added individually or in combinations thereof to the composition to produce the desired consistency and to enhance processibility of the coating composition. Suitable thickening agents include but are not limited to chemically modified bentonite clay, Rheox products Bentone AD, Bentone EW and Bentone 38, Sud-Chemie products Tixogel TE, Tixogel MP100 and Tixogel EZ100, and Southern Clay products Claytone 38, Claytone HT and NDO. While water soluable thickening agents such as amide or polyamide type thickening agents may be acceptable, it is preferred that a solvent soluable thickening agent be used. Specifically, it is preferred that chemically modified bentonite clay be used as the thickening agent.

Suitable anti-settling agents include but are not limited to chemically modified castor oil derivative, Rheox products MPA 60 and MPA 1078, Sud-Chemie products Y25X and Y40X, and Cray Valley products Crayvallac 60X and Crayvallac 40. While any of these will work, it is preferred that a solvent soluable agent be used. Specifically, it is preferred that chemically modified caster oil be used as the anti-settling agent.

Suitable wetting agents include polyester, acrylic cationic, anionic or neutral wetting agents. While suitable thickening agents, anti-settling agents, and wetting agents are listed, one skilled in the art realizes that there are many equivalent thickening agents, anti-settling agents and wetting agents that are suitable for use in the present Invention.

A preferable compounding ratio of the coating composition according to the present Invention is as follows:
(a) an epoxy resin with a weight per epoxide of 175 to 950 in the amount of 9–11 percent of the total weight of the coating composition;
(b) a mixed methyl-phenyl hydroxy functional silicone polymer in the amount of 13–17percent of the total weight of the coating composition;

(c) an organometallic catalyst in the amount of 3–7 percent of the total weight of the coating composition;

(d) a silane in the amount of 1—3 percent of the total weight of the coating composition;

(e) an anti-corrosive pigment in the amount of 5–15 percent of the total weight of the coating composition;

(f) an inert film reinforcing pigment in the amount of 6–10 percent of the total weight of the coating composition;

(g) calcium silicate fibers in the amount of 4–8 percent of the total weight of the coating composition;

(h) a mixture of synthetic silicone ground rubber, silica and fillers in the amount of 10–20 percent of the total weight of the coating composition; and (i) an organic solvent in the amount of 5–50 percent of the total weight of the coating composition, but more preferably in the range of 15–30 percent of the total weight.

Additionally, a manganese ferrite or copper chromite spinel type pigment of 5–15 percent of the total weight of the composition can be added to change the color and to enhance the performance of producing the composition. Further, a thickening agent of ½–1 percent, an anti-settling agent of ½–1 percent and a wetting agent of ½–3 percent of the total weight of the composition may be individually added or in combinations thereof to the composition to produce the desired consistency and to enhance the processibility of the coating.

The unique feature of the coating is the incorporation of ground silicon rubber and calcium silicate fiber which allow the depositing of a thick coat of liquid composition that, when thermochemically cured at either temperatures of at least 400 degrees Fahrenheit or at ambient temperatures, forms a continuous solid film 15 mils thick. This film has the effect of dampening sound and results in less heat transfer when it is placed on metal because metal is a much better conductor of heat than the coating composition. The coating composition can be applied to a ferrous or non-ferrous metallic substrate surface. The coating composition is applied by first cleaning the substrate surface using an alkali wash, a chemical pretreatment or a sand blast. The coating composition is then applied to the substrate surface by either an airless spray process, an air assisted airless spray process, a conventional spray process, or an electrostatic spray process. To complete the application of the coating composition, the coating composition is cured.

The coating composition can be either thermochemically cured or cured at room temperature. To thermochemically cure the coating composition, the substrate can be exposed to heat such that the substrate heats to 400 degrees Fahrenheit and remains at that temperature for approximately twenty (20) minutes or more. If the coating composition is thermochemically cured, then it is preferred that an organometallic catalyst be used to form the composition. Alternatively, the substrate can be left at room temperature for approximately sixty (60) minutes or more. If the coating composition is cured at room temperature, any catalyst that will react with an epoxide group is suitable to form the composition. It is preferred that a catalyst chosen from a polyamine catalyst, a Lewis acid catalyst or an isocyanate catalyst be used to cure and form the composition at an ambient temperature. The polyamine catalyst may be a silane diamine catalyst such as Whitco Chemical A1120, Dow Corning DC21, Dynasylan Damo-T and Addid 900.

Figure 2:
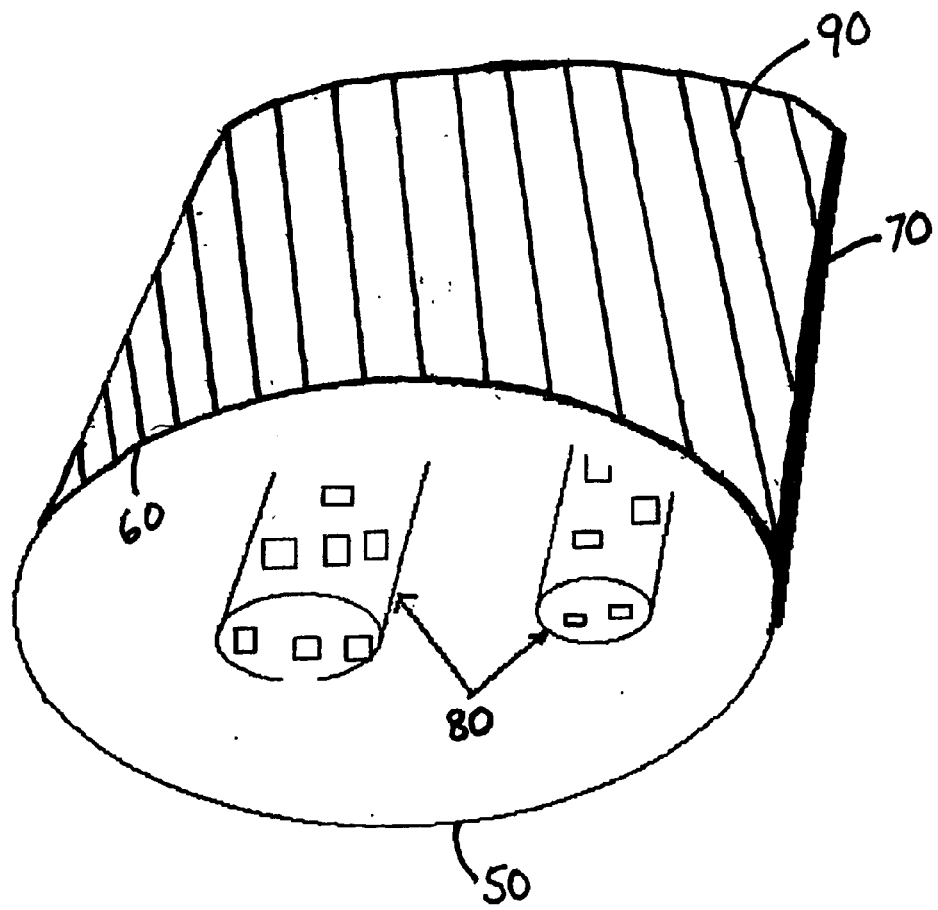
FIG. 2 is a cross-section view showing the use of the present Invention to produce a single wrap muffler.

As shown in FIG. 2, the film can be applied to a muffler to replace the inner wrap of steel used to make double sheeted or double wrapped exhaust mufflers. As a consequence of replacing in the inner sheet of steel, the muffler is lighter while maintaining or enhancing the sound dampening effects provided by the double wrapped construction. Also, since steel is a much better conductor of heat than the coating composition, replacing the steel with the composition produces are better insulated muffler, resulting in less heat transfer through the outer skin. As shown in FIG. 2, the present muffler 50 comprises a steel outside wrap 60, a rolled or welded seam 70 where the two edges of the wrap are joined, standard inside muffler components (80) and a coating of the composition 90 applied to the outside surface of the outside wrap 60.

Although the foregoing describes several embodiments of the invention, one of skill in the art will recognize that other advantages, features and modifications may exist. It is understood that the present invention is not to be limited to the details provided above, but rather may be modified within the scope of the appended claims.

I claim:

1. A cured, thermal insulating, corrosion resisting and noise reducing coating composition comprising:

a. an epoxy resin with a weight per epoxide of 175 to 950 ranging from about 9–12% of the total weight of the composition;

b. a mixed methyl-phenyl functional silicone polymer ranging from about 13–17% of the total weight of the composition;

c. a catalyst ranging from about 1–7% of the total weight of the composition;

d. a silane ranging from about 1–3% of the total weight of the composition;

e. an anti-corrosive pigment ranging from about 5–15% of the total weight of the composition;

f. an inert film reinforcing pigment ranging from about 6–10% of the total weight of the composition;

g. a plurality of calcium silicate fibers ranging from about 4–8% of the total weight of the composition;

h. a mixture of synthetic silicone rubber, silica and fillers ranging from about 10–20% of the total weight of the composition; and i. an organic solvent ranging from about 5–50% of the total weight of the composition.

2. The coating composition of claim 1 where the epoxy resin has a weight per epoxide of 185 to 950.

3. The coating composition of claim 1 where the epoxy resin has a weight per epoxide of 184–192.

4. The coating composition of claim 1 wherein the mixed methyl-phenyl functional group comprises at least one of dimethyl-diphenyl, dimethyl-phenyl, methyl-diphenyl, and methyl-phenyl group or combinations thereof.

5. The coating composition of claim 4 wherein the mixed methyl-phenyl functional silicone polymer further includes a hydroxyl group.

6. The coating composition of claim 1 wherein the mixed methyl-phenyl functional silicone polymer further includes a hydroxyl group.

7. The coating composition of claim 1 wherein the catalyst comprises at least one catalyst chosen from a polyamine catalyst, a Lewis acid catalyst, and an isocyanate catalyst.

8. The coating composition of claim 7 wherein the polyamine catalyst is a silane diamine.

9. The coating composition of claim 1 wherein the catalyst comprises at least one organometallic catalyst chosen from organometallic cobalt, tin, lead, zirconium, iron, vanadium, aluminum, calcium, manganese and lanthanum.

10. The coating composition of claim 9 wherein the organometallic catalyst comprises organometallic iron carboxylate ranging from about 1–3% of the total weight of the composition in combination with organometallic zinc ranging from about 2–4% of the total weight of the composition.

11. The coating composition of claim 1 wherein the silane comprises at least one silane chosen from aminopropyltriethoxysilane, N-(B-aminoethyl)-γ-aminopropyltrimethoxysilane, 3-methacryloxypropyltriethoxysilane, vinylbenzyl-aminemethoxy, 3-glycidoxypropyl-trimethoxysilane, methytrimethoxysilane, phenyltrimethoxysilane, and vinyltrimethoxysilane.

12. The coating composition of claim 1 wherein the anti-corrosive pigment comprises at least one anti-corrosive pigment chosen from zinc metaborates, lead chromates, zinc phosphates, and zinc chromates.

13. The coating composition of claim 1 wherein the reinforcing pigment comprises at least one reinforcing pigment chosen from aluminum silicate mica, titanium dioxide, lithopone, zinc oxide, calcium carbonate, barium sulfate, magnesium silicate, fumed silica, calcium clay, aluminum oxide, carbon/graphite, mica, and aluminum silicate.

14. The coating composition of claim 1 wherein the reinforcing pigment comprises potassium aluminum silicate mica.

15. The coating composition of claim 1 wherein the calcium silicate fibers comprises at least one calcium silicate fiber chosen from tricalcium silicate, dicalcium silicate, calcium and metasilicate.

16. The coating composition of claim 1 wherein the silicone rubber mixture comprises a heat cured linear plysiloxane polymer comprising a mixture of methyl, phenyl and vinyl monomer modifications wherein the heat cured linear polysiloxane polymer was cured in the presence of an organic peroxide that comprises at least one organic peroxide chosen from bis(2,4-Dichlorobenzoyl) peroxide, Di-Benzoyl peroxide, Di-cumyl peroxide, 2,5 Dimethyl-2,5 a bis(t-butylperoxy)hexane and Di-tertiarybutyl peroxide.

17. The coating composition of claim 1 wherein the organic solvent comprises at least one organic solvent chosen from an aromatic hydrocarbon organic solvent, an alcohol solvent, a ketone solvent, an ester solvent, or a glycol ether solvent.

18. The coating composition of claim 1 wherein the organic solvent comprises at least one organic solvent chosen from the group consisting of zylene, propylene glycol ether, acetate and butanol.

19. The coating composition of claim 1, further comprising a color changing pigment ranging from about 5–15% of the total weight of the composition.

20. The coating composition of claim 19 wherein the color changing pigment comprises at least one color changing pigment chosen from mixed iron oxides, carbon black pigment and lamp black pigment.

21. The coating composition of claim 19 wherein the color changing pigment comprises at least one color changing pigment chosen from manganese ferrite and copper chromite spinel type pigment.

22. The coating composition of claim 1, further comprising a thickening agent ranging from about ½–1% of the total weight of the composition.

23. The coating composition of claim 22 wherein the thickening agent comprises chemically modified bentonite clay.

24. The coating composition of claim 1, further comprising an anti-settling agent ranging from about ½–1% of the total weight of the composition.

25. The coating composition of claim 24 wherein the anti-settling agent comprises chemically modified caster oil.

26. The coating composition of claim 1, further comprising a wetting agent ranging from about ½–3% of the total weight of the composition.

27. The coating composition of claim 26 wherein the wetting agent comprise a wetting agent chosen from polyester, acrylic cationic, anionic and neutral wetting agents.

28. A thermochemically cured, thermal insulating, corrosion resisting and noise reducing coating composition comprising:
   a. an epoxy resin with a weight per epoxide of 175 to 950 ranging from about 9–11% of the total weight of the composition;
   b. a mixed methy-phenyl functional silicone polymer ranging from about 13–17% of the total weight of the composition.
   c. an organometallic catalyst ranging from about 1–7% of the total weight of the composition;
   d. a silane ranging from about 1–3% of the total weight of the composition;
   e. an anti-corrosive pigment ranging from about 5–15% of the total weight of the composition;
   f. an inert film reinforcing pigment ranging from about 6–10% of the total weight of the composition;
   g. a plurality of calcium silicate fibers ranging from about 4–8% of the total weight of the composition;
   h. a mixture of synthetic silicone rubber, silica and fillers ranging from about 10–20% of the total weight of the composition;
   i. an organic solvent ranging from about 5–50% of the total weight of the composition;
   j. a color changing pigment ranging from about 5–15% of the total weight of the composition;
   k. a thickening agent ranging from about ½–1% of the total weight of the composition;
   l. a anti-settling agent ranging from about ½–1% of the total weight of the composition; and
   m. a wetting agent ranging from about ½–3% of the total weight of the composition.

29. The coating composition of claim 28 where the epoxy resin has a weight per epoxide of 185 to 950.

30. The coating composition of claim 28 where the epoxy resin has a weight per epoxide of 185–192.

31. The coating composition of claim 28 wherein the mixed methyl-phenyl functional group comprises at least one of dimethyl-diphenyl, dimethyl-phenyl, methyl-dyphenyl, and methyl-phenyl group or combinations thereof.

32. The coating composition of claim 28 wherein the mixed methyl-phenyl functional silicone polymer further includes a hydroxy group.

33. The coating composition of claim 28 wherein the organometallic catalyst comprises organometallic iron carboxylate ranging from about 1–3% of the total weight of the composition in combination with organometallic zinc ranging from about 2–4% of the total weight of the composition.

34. The coating composition of claim 28 wherein the reinforcing pigment comprises potassium aluminum silicate mica.

35. The coating composition of claim 28 wherein the calcium silicate fibers comprises at least one calcium silicate fiber chosen from tricalcium silicate, dicalcium silicate, calcium and metasilicate.

36. The coating composition of claim 28 wherein the silicone rubber mixture comprises a heat cured linear polysiloxane polymer comprising a mixture of methyl, phenyl and vinyl monomer modifications wherein the heat cured linear polysiloxane polymer was heated cured in the presence of an organic peroxide that comprises at least one organic peroxide chosen from bis(2,4-Dichlorobenzoyl) peroxide, Di-Benzoyl peroxide, Di-cumyl peroxide, 2,5 Dimethyl-2,5 a bis(t-butylperoxy)hexane and Di-tertiarybutyl peroxide.

37. The coating composition of claim 28 wherein the organic solvent comprises at least one organic solvent chosen from zylene, propylene glycol ether, acetate and butanol.

38. The coating composition of claim 28 wherein the color changing pigment comprises at least one color changing pigment chosen from manganese ferrite and copper chromite spinel type pigment.

39. The coating composition of claim 28 wherein the thickening agent comprises chemically modified bentonite clay.

40. The coating composition of claim 28 wherein the anti-settling agent comprises chemically modified caster oil.

41. The coating composition of claim 28 wherein the wetting agent comprises at least one wetting agent chosen from polyester, acrylic cationic, anionic and neutral wetting agents.

42. A method of applying a thermal insulating, corrosion resisting and noise reducing coating composition to a substrate comprising the steps of:
  (a) cleaning the substrate surface;
  (b) choosing a coating composition comprising an epoxy resin with a weight per epoxide of 185 to 950 ranging from about 9–11% of the total weight of the composition; a mixed methyl-phenyl functional silicone polymer ranging from about 13–17% of the total weight of the composition; an organometallic catalyst ranging from about 1–7% of the total weight of the composition; a silane ranging from about 1–3% of the total weight of the composition; an anti-corrosive pigment ranging from about 5–15% of the total weight of the composition; an inert film reinforcing pigment ranging from about 6–10% of the total weight of the composition; a plurality of calcium silicate fibers ranging from about 4–8% of the total weight of the composition; a mixture of synthetic silicone rubber, silica and fillers ranging from about 10–20% of the total weight of the composition; an organic solvent ranging from about 5–50% of the total weight of the composition; a color changing pigment ranging from about 5–15% of the total weight of the composition; a thickening agent ranging from about ½–1% of the total weight of the composition; a anti-settling agent ranging from about ½–1% of the total weight of the composition; and a wetting agent ranging from about ½–3% of the total weight of the composition;
  (c) applying the coating to the substrate surface by a spray process; and
  (d) heating the substrate to at least 400 degrees Fahrenheit for at least twenty (20) minutes.

43. The method of applying the coating composition to the substrate surface of claim 42 wherein the substrate surface is a surface of a muffler.

44. The method of applying the coating composition to the substrate surface of claim 42 wherein the cleaning of the substrate is chosen from an alkali wash, a chemical pretreatment and a sand blast.

45. The method of applying the coating composition to the substrate surface of claim 42 wherein the spray process is chosen from a conventional spray process, an airless spray process, an air assisted airless spray process and an eletrostatic spray process.

46. A method of applying a thermal insulating, corrosion resisting and noise reducing coating composition to a substrate surface comprising the steps of:
  a. cleaning the substrate surface;
  b. choosing a coating composition comprising an epoxy resin with a weight per epoxide of 185 to 950 ranging from about 9–11% of the total weight of the composition; a mixed methyl-phenyl functional silicone polymer ranging from about 13–17% of the total weight of the composition; an catalyst that is reactant with an expoxide group, said catalyst ranging from about 1–7% of the total weight of the composition; a silane ranging from about 1–3% of the total weight of the composition; an anti-corrosive pigment ranging from about 5–15% of the total weight of the composition; an inert film reinforcing pigment ranging from about 6–10% of the total weight of the composition; a plurality of calcium silicate fibers ranging from about 4–8% of the total weight of the composition; a mixture of synthetic silicone rubber, silica and fillers ranging from about 10–20% of the total weight of the composition; an organic solvent ranging from about 5–50% of the total weight of the composition; a color changing pigment ranging from about 5–15% of the total weight of the composition; a thickening agent ranging from about ½–1% of the total weight of the composition; a anti-settling agent ranging from about ½–1% of the total weight of the composition; and a wetting agent ranging from about ½–3% of the total weight of the composition;
  c. applying the coating composition to the substrate surface by a spray process; and
  d. allowing the substrate to cure at room temperature for at least sixty (60) minutes.

47. The method of applying the coating composition to the substrate surface of claim 46 wherein the substrate surface is a surface of a muffler.

48. The method of applying the coating composition to the substrate surface of claim 46 wherein the method of cleaning the substrate is chosen from an alkali wash, a chemical pretreatment and a sand blast.

49. The method of applying the coating composition to the substrate surface of claim 46 wherein the spray process is chosen from a conventional spray process, an airless spray process, an air assisted airless spray process and an electrostatic spray process.

* * * * *